United States Patent [19]
Costrop et al.

[11] Patent Number: 5,345,335
[45] Date of Patent: Sep. 6, 1994

[54] OPTICALLY BUTTED ELECTRO-OPTICAL COMPONENTS

[75] Inventors: Dirk Costrop, Duffel; Frank Trouillard, Lint; Patrick Pandelaers, Brussel, all of Belgium

[73] Assignee: AGFA-Gevaert N.V., Mortsel, Belgium

[21] Appl. No.: 40,000

[22] Filed: Mar. 30, 1993

[30] Foreign Application Priority Data

Apr. 22, 1992 [EP] European Pat. Off. ........ 92201132.5

[51] Int. Cl.$^5$ ...................... H04N 1/028; H04N 1/18
[52] U.S. Cl. .................... 359/618; 359/638; 359/189; 359/193; 250/353; 250/208.2; 250/363.02; 250/363.08; 250/208.3; 250/227.2; 250/227.26; 250/227.29
[58] Field of Search ............... 359/618, 613, 194; 250/578, 330, 331, 332, 552, 208.2, 353, 363.02, 363.08, 208.3, 227.2, 227.26, 227.29; 350/171

[56] References Cited

U.S. PATENT DOCUMENTS 4,272,684  6/1981  Seachman ............... 250/578
5,044,727  9/1991  Steinle .................. 350/171

Primary Examiner—Viet Q. Nguyen
Attorney, Agent, or Firm—William J. Daniel

[57] ABSTRACT

In an imaging system having at least two optically butted CCD sensors disposed in angular relation to each other and onto which light images are projected by means of a light beam splitter, the correct spacial position of the sensors is determined providing the beam splitter with mounting surfaces on which the respective sensors are mounted and the sensors with lateral surfaces, and utilizing mounting members for the opposite ends of each sensor, each mounting member having a base surface and a supporting surface extending in true rectangular fashion thereon. The base surface of each mounting member is adhesively bonded to one of the mounting surfaces of the beam splitter and its supporting surface is adhesively bonded to a lateral surface of a sensor, such bonding being effected after each sensor has been correctly aligned.

15 Claims, 6 Drawing Sheets

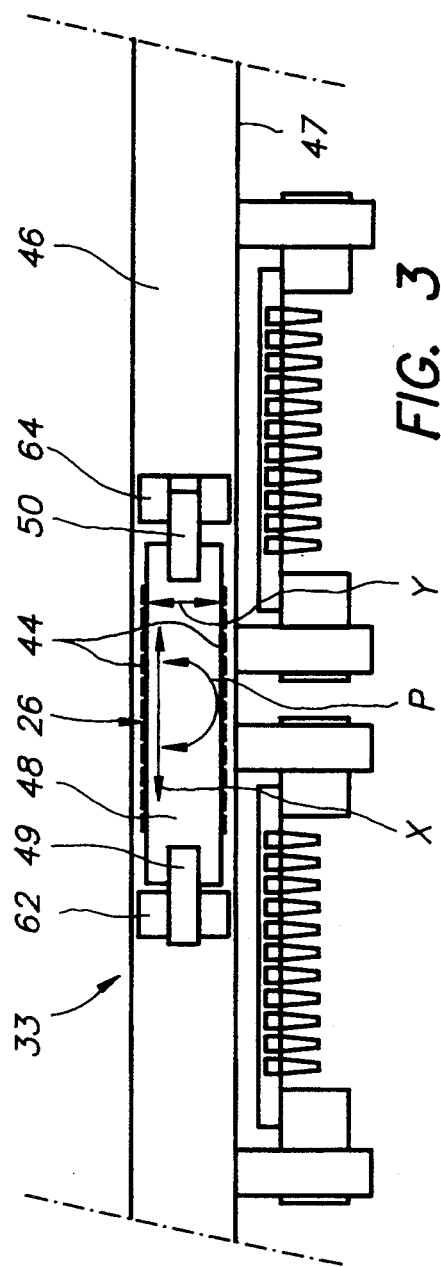
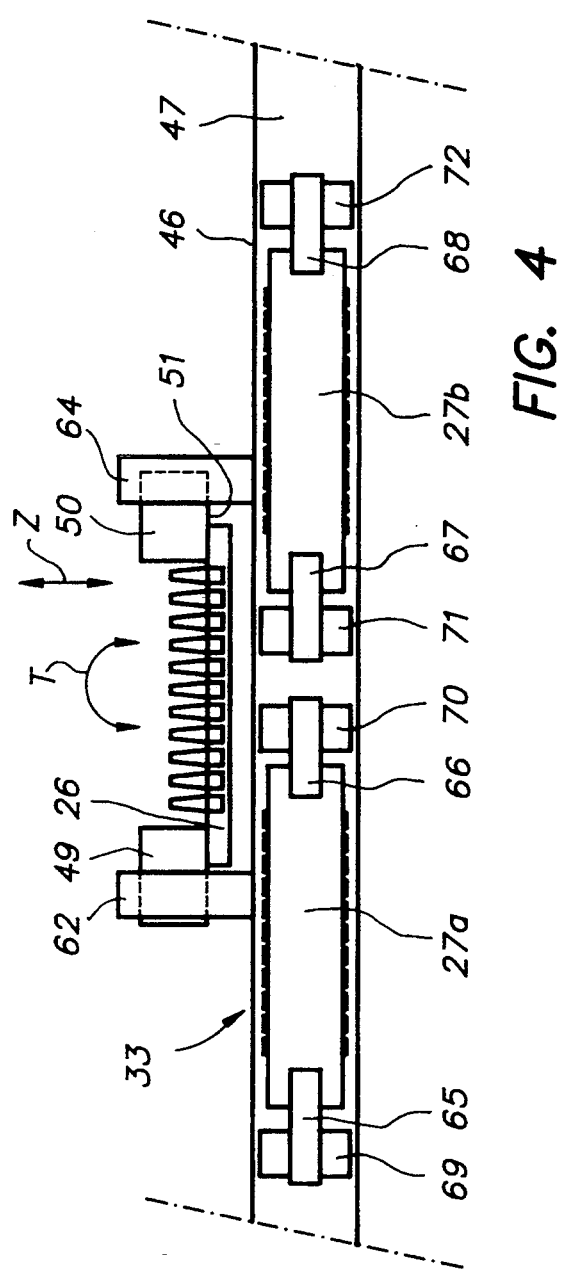

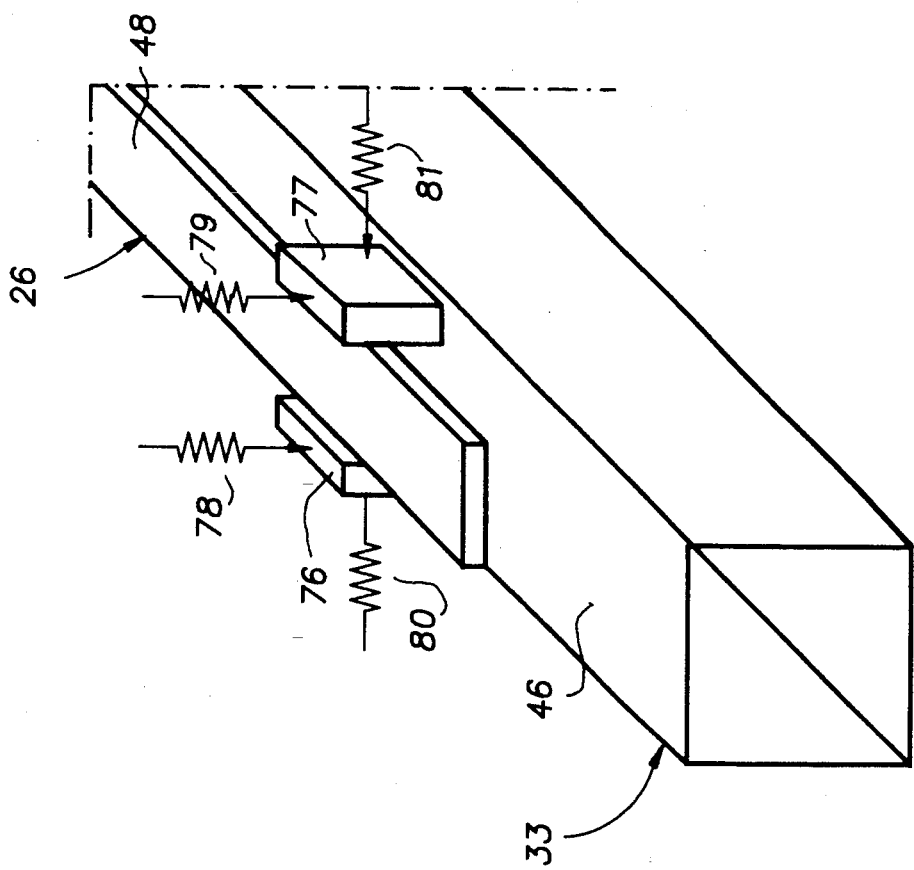
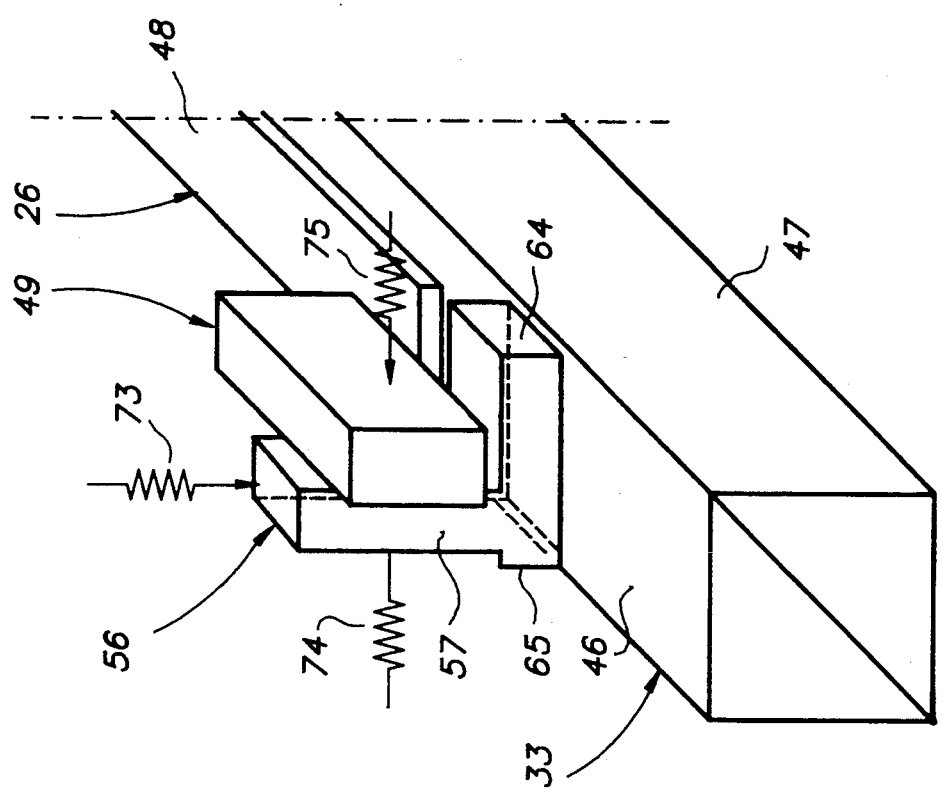

OPTICALLY BUTTED ELECTRO-OPTICAL COMPONENTS

BACKGROUND OF THE INVENTION

1. Field of the Invention

The present invention relates to optically butted electro-optical components in general, and to optically butted CCD (charge coupled devices) linear array sensors in image reading apparatus for providing electric signals corresponding to the image of an original by optical scanning, in particular.

2. Description of the Prior Art

In an image reading apparatus employed, for example, in a facsimile apparatus or a graphic scanner, an original moving in a determined direction is illuminated with light, and the reflected or transmitted light is focused through a lens onto a photoelectric converter, such as a linear photosensor array, to provide time-sequential electric image signals corresponding to a scanning line. Said photosensor array is usually composed of a CCD array or a photodiode array on which the image of a scanning line is focused by said lens.

The resolving power of the image is determined by that of the photosensor array, which is equal to the number of photoelectric converting elements in said photosensor array. Usually the number of said-elements in a today's CCD photosensor array is limited to 7500. CCD sensors with 10.000 components do exist but they are disproportionately expensive.

Image-reading apparatus are known comprising optical path dividing means, e.g. semitransparent prisms, for dividing the path for the light beam of a scanning line into two paths that each lead to a subfocal plane. A number of CCD's are mounted in both focal subplanes in staggered relationship so as to form optically butted CCD's. This technique is disclosed, e.g. in the article "A high-resolution, high-speed film scanner system using optically butted charge-coupled devices", by R. A. Whittlesey in SPIE, Vol. 149, 1978, p. 156–185.

A problem with the described arrangement is the exact spacial mounting of each CCD in its corresponding focal sub-planes. This is generally done by means of adjustment screws, levers, springs and the like that have their effect on five parameters that determine the exact position of a CCD component, viz. the lateral and the vertical position of the component, the rotation in its own plane, the axial position on the optical axis and the tilting about an axis normal to the optical axis and its own longitudinal axis. The process of adjustment is complicated by the fact that a CCD chip is often mounted inaccurately in its housing by the manufacturer. For instance, tolerances up to 0.5 mm between the positions of the lateral ends of a chip and the rear or front wall of the housing, usually a ceramic housing covered and closed by a glass panel, are not uncommon.

SUMMARY OF THE INVENTION

OBJECT OF THE INVENTION

It is an object of the invention to provide an imaging system with optically butted electro-optical components, which comprises fixing means allowing the correct spacial position of the components to be easily set.

It is a further object of the invention to provide an imaging system of the type in question, with fixing means for each electro-optical component featuring five degrees of freedom, to align and fix the electro-optical components in a matter that is very stable over time and under varying environmental conditions (temperature and moisture in particular).

It is in particular an object of the invention to provide an imaging system comprising optically butted CCD linear array sensors for use in an image scanner.

STATEMENT OF THE INVENTION

According to the present invention an imaging system which comprises lens means for focusing a first focal plane onto a second focal plane, optical path dividing means located between the lens means and one of said planes for dividing the optical path into at least two optical sub-paths leading to corresponding subfocal planes, at least one electro-optical component arranged in one and at least one other electro-optical component arranged in the other of said subfocal planes, and fixing means for fixing the spacial position of said electro-optical components so that the butted images thereof are in line and in focus in the other focal plane of the system, is characterized in that said fixing means comprises for each of said subfocal planes an elongated glass member with a mounting surface for the corresponding component(s), and at least two mounting legs with a base surface and a supporting surface extending in true rectangular relation on such base surface, the base surfaces being adhesively bonded to the mounting surface of said glass members and the supporting surfaces being adhesively bonded to lateral surfaces of the corresponding electro-optical component(s).

The term electro-optical stands in the present specification for receiving and transmitting components that can be point-like, linear or two-dimensional.

According to a suitable embodiment of the invention, the optical path dividing means is formed by a glass beam splitter, and the mounting surfaces for the mounting legs are formed by corresponding surfaces of such beam splitter. This makes possible a very stable mounting of the distinct electro-optical components in space and over time, and overcomes inaccuracies in the packaging of the electro-optical components.

The imaging system according to the present invention is designed primarily for obtaining an improved resolution in image scanning by means of optically butted charge-coupled devices, it being understood that the CCD's are located in the image (sub)focal plane of the system whereas the original to be scanned is located in the object focal plane of the system.

The inventive system can, however, also be used to align a plurality of two-dimensional sensor arrays, or light-emitting electro-optical components such as laser diodes.

Further, the optical path dividing means can also be arranged for splitting the optical path into subpaths that relate to a given part of the spectrum of the entering light, e.g. a blue, a green and a red subpath, these paths further conducting to optically overlapping sensors.

Suitable embodiments of the invention are as follows.

The lateral mounting surfaces of said electro-optical components are formed by laterally opposed surfaces of the free end of rectangular cantilever-type supports fitted on the side of the components remote from the mounting surface of the beam splitter.

Said cantilever-type supports comprise two rectangular blocks extending beyond both lateral ends of said electro-optical components and are fixed thereto by adhesive bonding.

Said blocks are made of glass. This has the advantage that the adhesive bonding can be done by means of an ultra violet curable resin so that once the correct position of the component has been obtained a short high-intensity exposure to UV light will cure the adhesive.

The imaging system comprises four mounting legs for each electro-optical component, said four legs being formed by the two legs of two U-like yokes, the opposed innerside surfaces of the legs forming the supporting surfaces co-operating with the opposed surfaces of the free ends of the cantilever-type supports, the legs of said yokes fitting with a small clearance over the free ends of said cantilever-type supports.

BRIEF DESCRIPTION OF THE DRAWINGS

The invention will be described hereinafter by way of example with reference to the accompanying drawings wherein:

FIG. 3 is a view according to the arrow 3 of FIG. 2, FIG. 4 is a view according to the arrow 4 of FIG. 2, FIG. 6 is an enlarged isometric view of another embodiment of a mounting leg, FIG. 7 is an enlarged isometric view of still another embodiment of mounting legs.

DETAILED DESCRIPTION OF THE INVENTION

Figure 1:
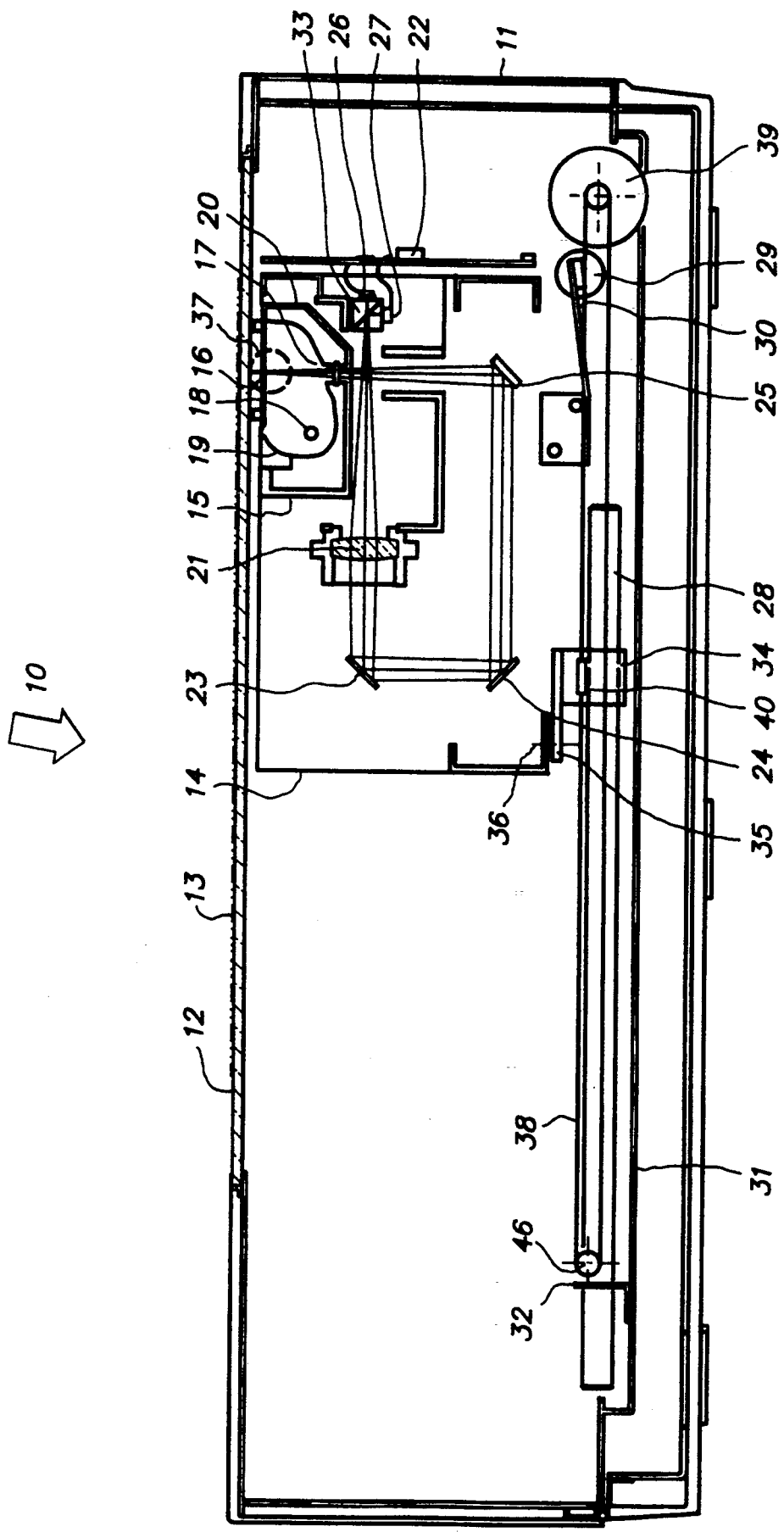
FIG. 1 is a diagrammatic representation of one embodiment of an imaging system according to the present invention.

Referring to FIG. 1 there is shown in diagrammatic fashion in cross-section an image scanner for scanning a document thereby to produce an electric output signal which is representative for the document, the apparatus is mounted within a light-tight cabinet 11 having at the top a clear glass plate 12 on which a document 13 to be scanned can be laid.

Inside the cabinet there is a scanning carriage 14 with a light box 15. The top of the light box has a light-transmitting opening 16 and the bottom of the box has an exposure slot 17. Both openings extend transversely of the box. The light box comprises a tubular exposure lamp 18 and curved reflectors 19 and 20 directing light upwardly through opening 16.

The scanning carriage 14 further comprises a lens 21 and mirrors 23, 24 and 25. The lens is mounted in such a manner that a sharp image line of document 14 is focused by means of a beam splitter 33 on light-sensor arrays 26 and 27, which are mounted on beam splitter 33 and transduce the optical line signal into an electric line signal that is conducted to an output terminal 22. This terminal is connected to an output cable (not shown) for transmission of the signal to processing means, e.g. in the form of a visual display unit, a photographic printing apparatus for producing a visible or developable latent image on a printing plate or other component, a thermographic printer, a facsimile apparatus, etc.

The scanning carriage is displaceable according to the longitudinal direction of the scanner through the intermediary of a central supporting rod 28 and two lateral supporting rollers, only one being visible as 29. Rod 28 is fixed to base plate 31 by a bracket 32, and guides via a precision sleeve 34 a support 35 along a true rectilinear path. Support 35 is connected to carriage 14 via an elastic coupling 36.

The lateral supporting rollers are connected to the scanning unit via elastic arms, such as the spring 30, whereby the scanning unit is urged upwardly thereby making rolling contact with the lower side of the glass plate 12 via two laterally spaced bearing members, which can be conventional ball bearings, one being shown as 37.

The described arrangement ensures that translation of the scanning carriage occurs in a plane running truly parallel with the glass plate since the glass plate in fact forms the reference support for the scanning unit. In this way, the sharpness of an image line reproduced on the sensor arrays 26 and 27 is limited only by occasional imperfections in the geometry of the glass plate 12. Further details about the guide system of the scanning unit and of its adjustment can be found in our co-pending application entitled "Optical scanning apparatus" filed in EU on Mar. 3, 1991 under No. 91 200 531.1.

The drive of the scanning carriage is represented in a simplified way by a steel cable 38 and a motor 39, the upper reach of the cable being coupled with support 35 at position 40. A suitable drive system for the carriage is described in detail in our co-pending application entitled "Drive system for a scanning unit" filed in EU on Sep. 26, 1991, under No. 91 202 504.6.

Figure 2:
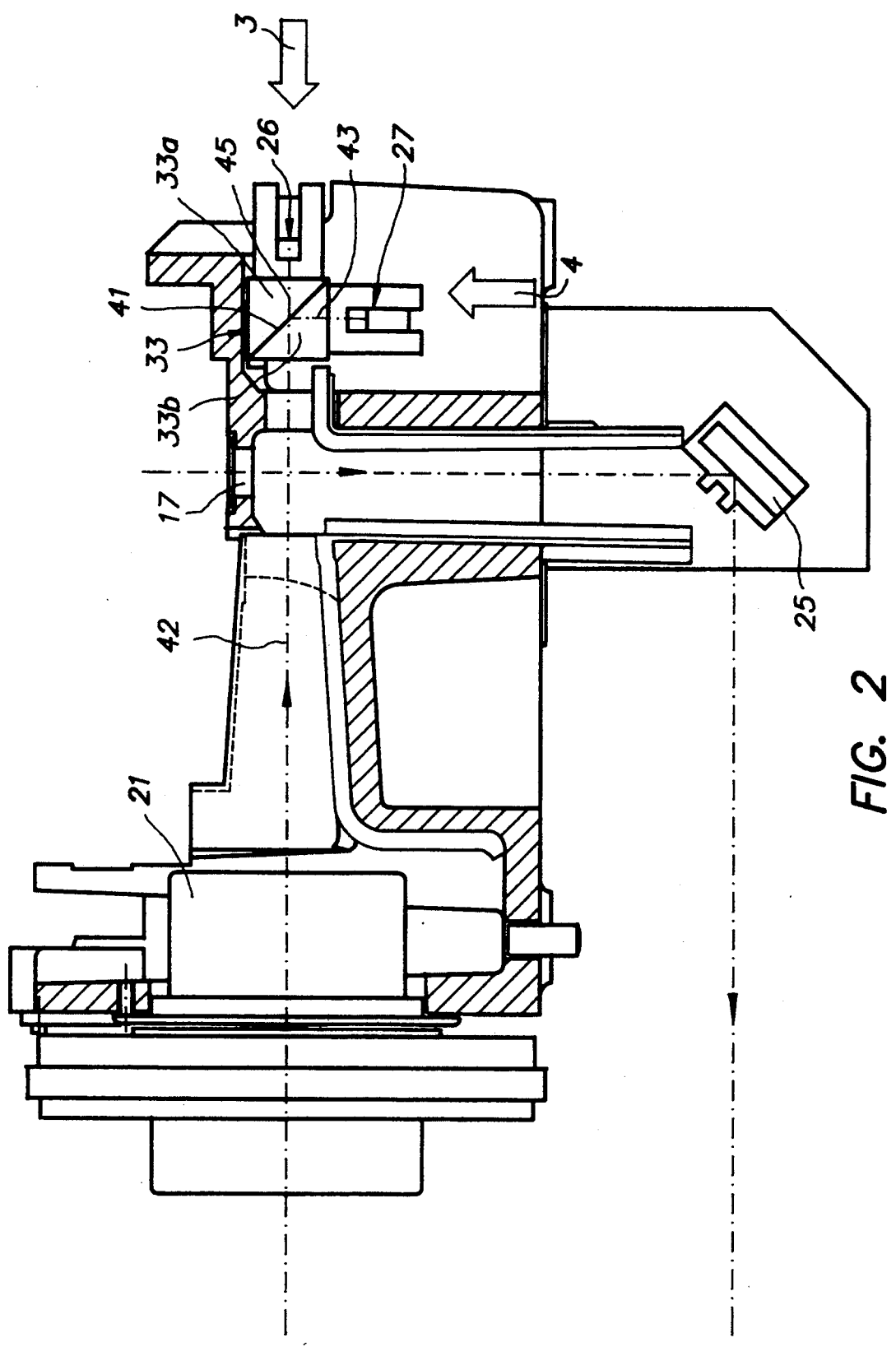
FIG. 2 is an enlarged view of the lens and the beam splitter with the CCD image sensors mounted thereon, of FIG. 1.

FIG. 2 is an enlarged view of lens 21 and beam splitter 33 with light sensor arrays 26 and 27 mounted on adjacent faces of the beam splitter.

The beam splitter is a conventional glass beam with a square cross section being assembled from two triangular subbeams 33a and 33b that are united on common face 41 operating as a semitransparent mirror to reflect a portion of the incoming radiation of path 42 to sensors 27 on optical subpath 43, and transmit another portion to sensors 26 on optical subpath 45.

A detailed view of the mounting of sensor arrays 26 and 27 is shown in each of FIGS. 3 and 4, which are detailed views of FIG. 2 taken according to the respective arrows 3 and 4.

The sensor arrangement comprises in fact three distinct CCD image sensors, one CCD sensor 26 being mounted on the rear surface 46 of beam splitter 33, and two other CCD sensors 27a and 27b being mounted in linearly spaced relationship on the bottom surface 47 of the beam splitter. The CCD sensors are conventional components consisting of a ceramic housing with two rows of connector pins 44 at the rear side of the sensor and a glass panel (not shown) covering the front side of the sensor. A microchip comprising thousands of distinct sensors is embedded in the housing and can be exposed through the glass panel. It has been mentioned already that mounting of the sensor chip in the housing is done with limited precision by the manufacturer of this component. Consequently it will be understood that the different faces of the ceramic housing do not constitute a true reference plane for such mounting.

Figure 5:
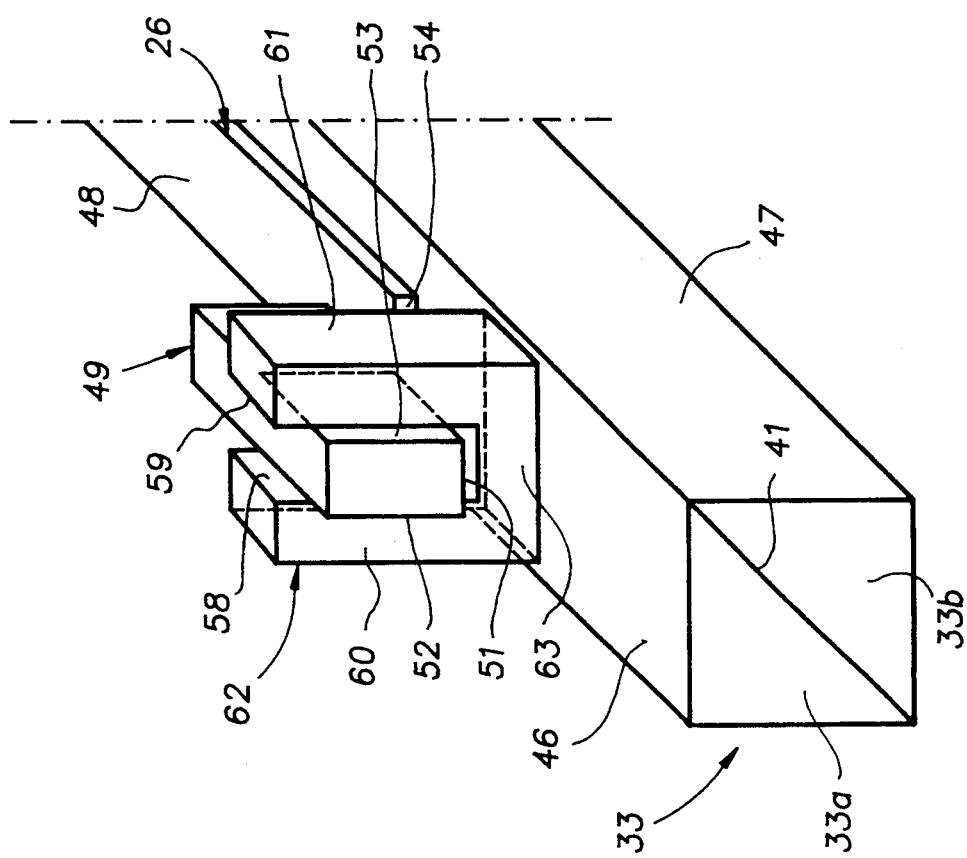
FIG. 5 is an enlarged isometric view of a mounting yoke.

The mounting of a CCD sensor is described hereinafter for sensor 26 with reference to FIGS. 3 to 5.

First, there is the preparation of the CCD sensor in view of its mounting on the beam splitter. The top surface 48 of the CCD sensor is provided with two upstanding supports 49 and 50 which in the present embodiment are square blocks cut e.g. from a sheet of float glass. It is important for these blocks that their bottom surface, viz. surface 51 that will be adhesively bonded to the sensor top surface 48, be truly perpendicular to their opposed lateral surfaces 52 and 53 (FIG. 5). A suitable way of carrying out the described adhesive bonding is to locate both supports 49 and 50 in an appropriate holder, the bonding surfaces 51 pointing upwardly, to apply adhesive to said surfaces and then to put the CCD sensor upside down on said bonding surfaces while exerting a slight pressure. There is no need for the supports to take an accurate position on the ends of the CCD sensor as long as they have an end portion which freely projects in cantilevered relation over the transverse end edges 54 of the CCD sensors in order to leave freely accessible lateral surfaces 52 and 53, and is located approximately on the longitudinal centre line of the CCD sensor. The sensor is left in position until the adhesive has set under conditions of heat, moisture, or UV-radiation, depending on the type of adhesive used.

Surfaces 52 and 53 co-operate with supporting surfaces 58 and 59 which are the parallel inner surfaces of the legs 60 and 61 of yoke 62. Surfaces 58 and 59 are truly normal to bottom surface 63 of yoke 62. The distance between inner surfaces 58 and 59 is very slightly larger than the corresponding distance between surfaces 52 and 53 of support 49.

The mounting of a sensor prepared as described hereinbefore is as follows. A zero insertion force socket is put over the connection pins of the sensor and locked so that any further manipulation of the sensor can occur by means of this socket. This socket clampfits in a frame forming part of an adjusting mechanism with micrometer setting screws, known in themselves, for altering the spacial position of the sensor as will be described hereinafter. Adhesive has been applied to the bottom face 63 in each of the two yokes 62 and 64 standing on surface 46 of beam splitter 33. Small spring means, not shown, bias the yokes on the beam splitter, while yet allowing sliding and rotational motions of the yokes on the beam splitter. Adhesive has also been applied to the lateral faces 52 and 53 of cantilever supports 49 and 50 at either end of the sensor.

An appropriate optical test pattern is projected through lens 21 on the sensor, and the electric output signal of the sensor is displayed on the screen of a CRT in order to show the position of the sensor. Then the adjustment screws are actuated to set the sensor in its correct spacial position. This setting involves five independent adjustments.

First, a longitudinal adjustment as indicated by arrow X in FIG. 3. Second, a transverse adjustment as indicated by Y, and third a pivotal adjustment as indicated by P. It should be understood that during these adjustments the base faces of yokes 62 and 64 are free to become displaced over face 46 of the beam splitter while still being urged under a slight bias thereon. The mutual distance between the yokes is not at all critical as long as there is a sufficient contact area between the lateral surfaces of supports 49 and 50, and the corresponding supporting faces of the legs of the yokes.

The fourth adjustment of the CCD sensor involves a vertical displacement of the sensor, as indicated by Z in FIG. 4, and a fifth adjustment is a tilting in the plane of supports 49 and 50 as indicated by T.

The correct spacial position of the CCD sensor being obtained as described, the adhesive of the different bonding places is made to quickly set, e.g. by exposure to UV-radiation.

Next the two CCD sensors 27a and 27b are mounted on face 47 of the beam splitter. The two sensors have been provided with cantilever supports 65 to 68 as described hereinbefore for supports 49 and 50 of CCD sensor 26, and are engaged with yokes 69 to 72 and with zero insertion force connectors for co-operation with appropriate positioning means to enable the individual adjustment of both sensors. Sensors 27a and 27b partially overlap sensor 26 since the outer ends of the packages of the sensors are not sensitive to light. Both sensors 27a and 27b are accurately adjusted in order to bring them in line and in focus with the projected line of the test image. It should be understood that the image subplanes of the system are not the two output faces of the beam splitter but planes that are a few millimeters distant therefrom.

The following data illustrate the described system.
CCD sensors 26, 27a and 27b:
type TCD 106C-2.
5000 pixels per sensor.
Scanning width of document 13:
302 mm.
Supports 49, 50 and 65 to 68:
made from float glass
thickness: 4 mm
size: 6×12 mm
Yokes 62, 64 and 69 to 72:
made from float glass
thickness: 5 mm
Maximum clearance between the legs of the yokes and the cantilever supports:
0.07 mm.
Adhesive used for bonding:
UV-curable resin on methacrylate-acrylate basis
Maximum shrinkage of the adhesive during curing:
3%.

The invention is not limited to the described embodiment but may comprise four or more CCD sensors mounted optically butted in order to further increase the image resolution.

FIG. 6 illustrates an embodiment, which comprises two legs only for holding a CCD sensor 26.

Each leg is formed by the upstanding leg of an L-like member, such as member 56, which has an upstanding leg 57 and a base 64 resting on surface of beam splitter 33.

Base 64 may occasionally have a heel 65 for better stabilizing on the beam splitter during adjustment.

First spring means, shown diagrammatically by spring 73, is provided for resiliently urging base 64 onto the beam splitter.

Second spring means, shown diagrammatically by springs 74 and 75, resiliently urge supporting block 49 in contact with the corresponding supporting surface of leg 57. It should be understood that the biasing force of the distinct spring means is such as to allow unhindered three-dimensional displacement of support 49 during adjustment of the position of sensor 26, while yet maintaining tight contact of corresponding surfaces with the thin layer of adhesive separating them from each other.

After the correct position of CCD sensor 26 has been obtained, the adhesive is made to cure after which the beam splitter can be removed from its holder and reversed over 90 degrees in order to mount CCD sensors 27a and 27b in a similar way on surface 47.

FIG. 7 illustrates an embodiment in which no preparation of a CCD sensor occurs. As a matter of fact, a CCD sensor 26 is mounted on beam splitter 33 by means of four mounting legs, only two of them being shown as 76 and 77. The legs can be rectangular components cut from float glass that are biased on lateral longitudinal sides of sensor 26 and on surface 46 of beam splitter 33 by appropriate spring means, shown diagrammatically by springs 78, 79 and 80, 81 respectively.

Figure 8:
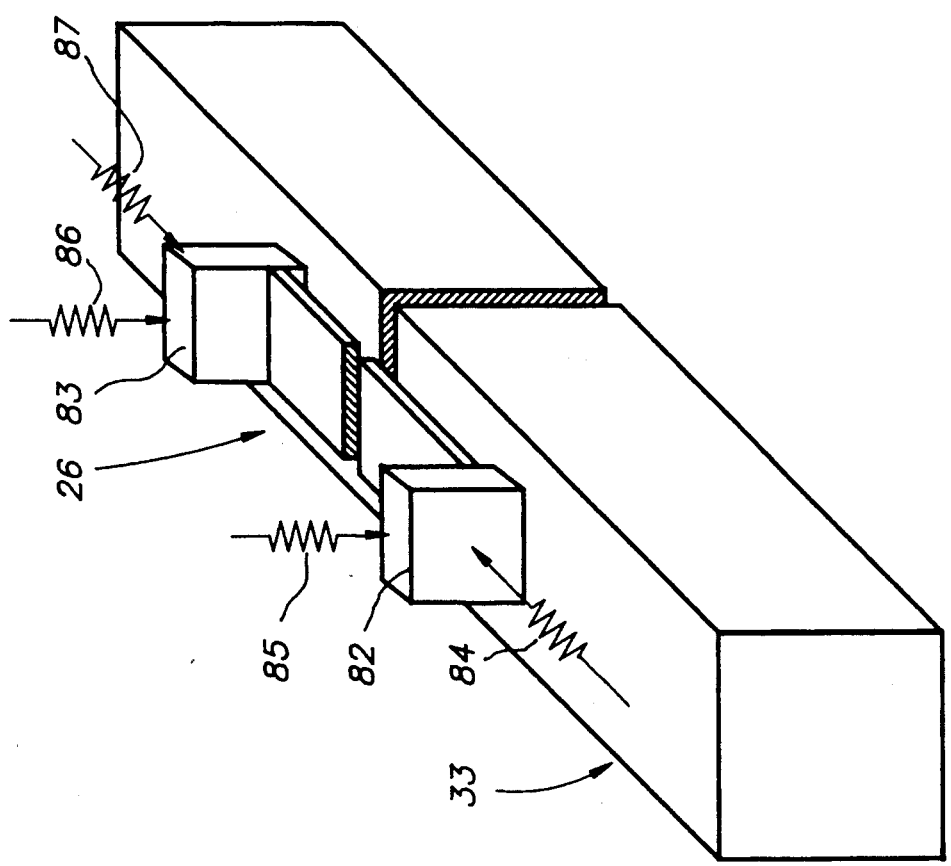
FIG. 8 is an enlarged isometric view of still another embodiment comprising two mounting legs.

FIG. 8, finally, illustrates another embodiment in which no preparation of a CCD sensor is done. CCD sensor 26, shown partly broken away, is mounted on beam splitter 33 by means of two mounting legs 82 and 83 having a width corresponding nearly with that of the sensor and being mounted at the transverse ends of the sensor. The legs are biased during their adjustment by spring means, shown diagrammatically by springs 84, 85, 86 and 87 respectively.

The invention is not limited to the use of UV-curable resins. Thus the yokes or legs for mounting the optical components need not necessarily be made of glass but may also be made of metal, ceramics, and the like. In that case the adhesive must be a type that cures e.g. under conditions of moisture or heat.

Finally, it should be understood that the imaging system according to the invention is not limited to the use of CCD sensors or linear arrays of photosensitive sensors in general, but that it encompasses also line-like light emitters of limited length that are mounted in the focal subplanes of beam-splitting means in order to produce in the opposite focal plane of an optical system one line of light of substantial length.

We claim:

1. An imaging device which comprises lens means for focusing a first focal plane onto a second focal plane along an optical path, optical path dividing means located between the lens means and one of said focal planes for dividing the optical path into at least two optical subpaths leading to corresponding subfocal planes, at least one electro-optical component arranged in each of said subfocal planes, and fixing means for fixing the spatial position of each of said electro-optical components so that said components are correctly aligned relative to the subfocal plane at which it is arranged, in combination, the improvement wherein each of said electro-optical components has at least one pair of lateral surface thereon, and said fixing means comprises an elongated glass member (33) with a mounting surface for each of said components at each of said subfocal planes, and for each said component at least pair of mounting legs each with a base surface (63) and a supporting surface (58, 59) extending in true rectangular relation to such base surface, each of the base surfaces being adhesively bonded to a mounting surface of said glass member and the supporting surfaces of each pair of mounting legs being adhesively bonded to the pair of lateral surfaces on a corresponding electro-optical component.

2. An imaging system according to claim 1, wherein each of said electro-optical components is elongated in one direction, and said lateral surfaces on each component run parallel with the lengthwise direction of such component.

3. An imaging system according to claim 1, wherein each of said electro-optical components is fitted on a side thereof remote from the mounting surface of said glass member for said component with at least one rectangular support projecting in cantilever fashion from an end of said component side to terminate in a free end, and said lateral surfaces for said component are formed as lateral surfaces on said free end of said rectangular support.

4. An imaging system according to claim 1, wherein each of said electro-optical components have transverse end edges at opposite ends thereof and a rectangular block is mounted on said remote face of said component with its free end extending beyond each of the transverse end edges of said electro-optical component to form the rectangular support for such component.

5. An imaging system according to claim 4, wherein said blocks are fitted to said electro-optical components by adhesive bonding.

6. An imaging system according to 5, wherein said blocks are made of glass.

7. An imaging system according to claim 3, which comprises two pairs of mounting legs for each electro-optical component.

8. An imaging system according to claim 7, wherein said two pairs of legs are formed by the leg of two U-shaped yokes, the legs of each yoke having opposed inner surfaces forming the supporting surfaces co-operating with the free end of one of said rectangular supports for the adhesive bonding of said support for said legs, the free end of each of said supports fitting with a small clearance between the opposed inner surfaces of said cooperating therewith.

9. An imaging system according to claim 8, wherein said clearance is smaller than 0.07 mm.

10. An imaging system according to claim 1, wherein said first focal plane is an object plane formed by the bed of a scanner for scanning the image of a document and said subfocal planes together constitute an image plane, and the electro-optical components are each constituted by an array of a plurality of sensors arranged in linear relation in the sub-planes.

11. An imaging system according to claim 10, wherein said linear array sensors are light-sensitive CCD's.

12. An imaging system according to claim 1, wherein said optical path dividing means is formed by a glass beam splitter.

13. An imaging plane according to claim 12, wherein said beam splitter has two longitudinal surfaces thereon and said longitudinal surfaces serve as mounting surfaces for the components.

14. An imaging system according to claim 1, wherein said optical path dividing means is an elongated member having two longitudinal surfaces thereon forming said mounting surfaces for said components and each of said electro-optical components is an array of a plurality of sensors arranged in linear relation, and at least one such linear array of sensors is mounted on a first one of said longitudinal surfaces and at least two such linear arrays of sensors are mounted on a second one of said longitudinal surfaces in staggered relationship with said one sensor mounted on said first one of said surfaces.

15. An imaging system according to claim 1, wherein each of the electro-optical components is an elongated light sources located in one of said subfocal planes and the combination of said light sources is projected as a single line by said lens on said first focal plane of the system.

* * * * *